(12) United States Patent
Sano et al.

(10) Patent No.: US 8,187,754 B2
(45) Date of Patent: May 29, 2012

(54) COIN-TYPE NON-AQUEOUS ELECTROLYTE BATTERY

(75) Inventors: Youko Sano, Osaka (JP); Yasuhiko Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 1053 days.

(21) Appl. No.: 11/869,915

(22) Filed: Oct. 10, 2007

(65) Prior Publication Data

US 2008/0090149 A1    Apr. 17, 2008

(30) Foreign Application Priority Data

Oct. 11, 2006   (JP) ................................. 2006-277539

(51) Int. Cl.
*H01M 4/62*   (2006.01)
(52) U.S. Cl. ...................... 429/232; 429/128; 429/218.1
(58) Field of Classification Search ......................... None
See application file for complete search history.

(56) References Cited

U.S. PATENT DOCUMENTS

| | | | |
|---|---|---|---|
| 4,945,014 A * | 7/1990 | Miyabayashi et al. ... | 429/231.95 |
| 2002/0061449 A1 * | 5/2002 | Maruo et al. ................. | 429/303 |
| 2002/0122985 A1 * | 9/2002 | Sato et al. ..................... | 429/232 |
| 2003/0148184 A1 * | 8/2003 | Omaru et al. ............ | 429/231.95 |
| 2006/0035149 A1 | 2/2006 | Nanba et al. | |

FOREIGN PATENT DOCUMENTS

| | | | |
|---|---|---|---|
| JP | 2000-173612 | * | 6/2000 |
| JP | 2004178922 | | 6/2004 |
| JP | 2005222933 | | 8/2005 |
| WO | 2005067081 | | 7/2005 |

* cited by examiner

*Primary Examiner* — Ula C Ruddock
*Assistant Examiner* — Tony Chuo
(74) *Attorney, Agent, or Firm* — Dickinson Wright PLLC

(57) ABSTRACT

The non-aqueous electrolyte battery of the present invention includes a positive electrode, a negative electrode, a separator disposed between the positive electrode and the negative electrode, and a non-aqueous electrolyte. The negative electrode includes a molded body including Si-containing negative electrode active material particles and a conductive agent. The conductive agent includes a first conductive agent and a fibrous second conductive agent. The first conductive agent covers at least a portion of the surface of the Si-containing negative electrode active material particles, and the second conductive agent is in contact with at least two Si-containing negative electrode active material particles with the first conductive agent on the surface thereof.

12 Claims, 1 Drawing Sheet

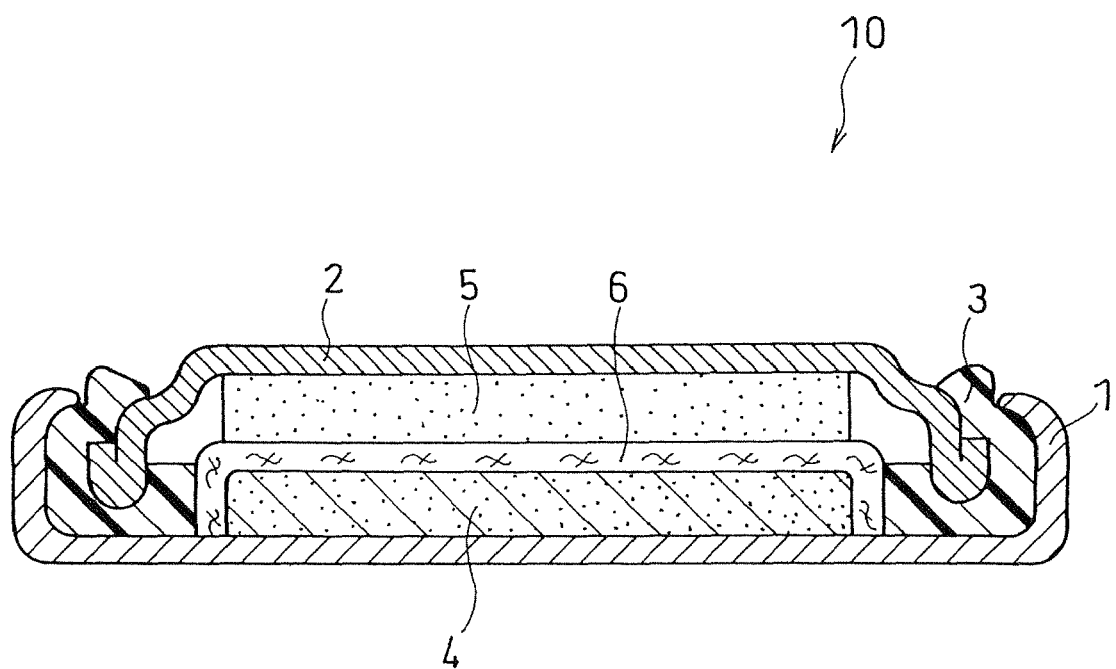

COIN-TYPE NON-AQUEOUS ELECTROLYTE BATTERY

FIELD OF THE INVENTION

The present invention relates to non-aqueous electrolyte batteries, particularly to an improvement of the negative electrode of a non-aqueous electrolyte battery.

BACKGROUND OF THE INVENTION

Among non-aqueous electrolyte secondary batteries, lithium ion secondary batteries using a material capable of absorbing and desorbing lithium ions represented by carbon materials as a negative electrode active material have been in practical use. For the negative electrode of such lithium ion secondary batteries, generally, graphite and carbon black are used as conductive agents.

In a negative electrode including such a negative electrode active material and a conductive agent, the charge and discharge capacity per unit mass has been improved to nearly reach the theoretical capacity, and therefore the energy density per unit mass is reaching its limit.

Thus, to improve the electrode utilization rate, there has been an attempt to decrease the amount of the material not contributing to the discharge capacity in the electrode (for example, binders and conductive agents).

For example, Japanese Laid-Open Patent Publication No. 2005-222933 (Document 1) has proposed a negative electrode using styrene butadiene rubber (abbreviated as SBR) as the binder and plural kinds of vapor-grown carbon fibers as the conductive agent. Such a negative electrode is excellent in cycle characteristics and high-speed charge and discharge characteristics, as well as high in energy density. The SBR mentioned above functions with a small amount, compared with fluorocarbon resins represented by polyvinylidene fluoride conventionally used as the negative electrode binder. In addition, with SBR, manufacturing steps can be simplified, since it is used as an aqueous dispersion. The vapor-grown carbon fiber is highly electrically conductive compared with conventional carbon black such as acetylene black, and also is able to improve electrode strength.

Further, with the trend toward small size, lightweight, and high performance mobile devices, lithium ion secondary batteries are also required to have high capacity. Silicon (theoretical capacity: 4199 mAh/g) type active materials have been proposed in place of carbon material type active materials represented by graphite (theoretical capacity: 372 mAh/g). However, the silicon type active materials undergo a high degree of volume change when lithium ions are absorbed and desorbed. For example, when silicon simple substance maximally absorbs lithium upon charging, the volume of silicon simple substance theoretically increases up to 4.1 times the volume of silicon simple substance not absorbing lithium. On the other hand, in the case of graphite, since the intercalation reaction is used, lithium is intercalated between the graphite layers. Thus, the volume of graphite with lithium absorbed increases only up to about 1.1 times the volume of graphite not absorbing lithium.

Thus, in the case of the silicon type active materials, gaps are created between the active material particles due to its high degree of volume change, and therefore the negative electrode portion that effectively contributes to the battery capacity decreases. Further, the volume change causes cracks in the active material particles, making the active material particles finer. When the active material particles are made finer, the electron conduction network based on contacts between the active material particles is disconnected. Thus, the negative electrode portion that cannot contribute to the electrochemical reaction (the portion that cannot contribute to the battery capacity) increases. This leads to a decrease in charge and discharge capacity, or an increase in internal resistance.

Japanese Laid-Open Patent Publication No. 2004-178922 (Document 2) has proposed mixing particles containing a compound including silicon atoms with vapor-grown carbon fiber, and covering at least a portion of the surface of the particles containing the compound including silicon atoms with a carbonaceous material such as phenolic resin.

The negative electrode including a current collector and a material mixture layer containing the active material carried thereon is made by mixing an electrode material mixture with water or an organic solvent to obtain a material mixture paste, and applying the paste to the current collector. In such a negative electrode, the current collector and the material mixture layer are bonded by a binder. The change of the current collector size upon charge and discharge is small, and the thickness of the material mixture layer carried on the current collector is thinner than the thickness of a pellet of a molded body made of a negative electrode material mixture. Thus, the bond between the current collector and the negative electrode material mixture can be kept easily. Further, in the material mixture including vapor-grown carbon fiber and the particles containing a compound including silicon atoms, contacts between the active material particles and the conductive agent can be further easily kept compared with the material mixture using carbon black as the conductive agent, due to the use of fibrous conductive agent.

Further, in the case of the active material particles in which at least a portion of the surface of the particles containing a compound including silicon atoms is covered with a carbonaceous material, charge and discharge cycle characteristics and low temperature characteristics can be improved to a certain degree.

However, in the case of the negative electrode not including a current collector and formed only of a pellet of a bulky molded body, its thickness is more than the thickness of the electrode including the current collector and the active material layer. Thus, with repetitive expansion and contraction of the active material upon charge and discharge, compared with the electrode including the current collector and the active material layer, the degree of expansion and contraction is high. Therefore, in a negative electrode made with the molded body, the electric conductivity between the active material particles cannot be kept just by mixing the active material particles and the vapor-grown carbon fiber, and charge and discharge cycle characteristics drastically declines.

Conventionally, the decline in charge and discharge cycle characteristics in batteries including the carbon material type active material has been regarded as due to the decline in current collecting ability. On the other hand, in batteries including the negative electrode active material containing Si, the decline in charge and discharge cycle characteristics is probably due not only to the decline in current collecting ability, but also to the fact that with the repetitive expansion and contraction of the active material including Si, a new surface is created on the active material, and a film derived from the non-aqueous electrolyte is formed on the surface thereof. Thus, to curb the decline in charge and discharge cycle characteristics, it is important to curb the formation of the film, and to keep the electric conductivity between the active material particles.

BRIEF SUMMARY OF THE INVENTION

A non-aqueous electrolyte battery of the present invention includes a positive electrode, a negative electrode, a separator disposed between the positive electrode and the negative electrode, and a non-aqueous electrolyte. The negative electrode includes a molded body including Si-containing negative electrode active material particles and a conductive agent. The conductive agent includes a first conductive agent and a fibrous second conductive agent. The first conductive agent covers at least a portion of the surface of the Si-containing negative electrode active material particles. The second conductive agent is fibrous, and has an average fiber diameter larger than the average diameter of the first conductive agent. The second conductive agent preferably is in contact with at least two Si-containing negative electrode active material particles. The thickness of the molded body is preferably 100 to 800 μm.

Based on the present invention, when the porosity of the molded body is 20 to 75%, the resistivity of the molded body at 25° C. can be made 20Ω·cm or less. Further, when the porosity of the molded body is 35 to 75%, the resistivity of the molded body can be made 20Ω·cm or less.

The first conductive agent preferably includes a carbon material with a specific surface area of 200 to 800 $m^2/g$. The carbon material further preferably includes at least one selected from the group consisting of carbon black and carbon fiber A.

The first conductive agent preferably makes up 1 to 19 wt % of the molded body.

The second conductive agent preferably includes carbon fiber B. The carbon fiber B preferably has a hollow structure. The average fiber length of the second conductive agent is preferably 5 μm to 500 μm.

The second conductive agent preferably makes up 4 to 22 wt % of the molded body.

The negative electrode active material preferably includes an alloy of a first metal element and a second metal element. The first metal element is preferably Si and the second metal element is preferably incapable of forming an alloy with Li. The second metal element is preferably at least one selected from the group consisting of Ti, Zr, Fe, Co, Ni, and Cu.

The average diameter of the first conductive agent is preferably 5 nm or more and 60 nm or less. The average fiber diameter of the second conductive agent is 70 nm or more and 7 μm or less.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 1 is a cross-sectional view schematically illustrating a non-aqueous electrolyte battery of an embodiment of the present invention.

DETAILED DESCRIPTION OF THE INVENTION

In the following, the present invention is described by referring to the FIG.

A non-aqueous electrolyte battery of the present invention includes a positive electrode, a negative electrode, a separator disposed between the positive electrode and the negative electrode, and a non-aqueous electrolyte. The negative electrode includes a molded body including Si-containing negative electrode active material particles and a conductive agent, and does not include a current collector. The conductive agent includes a first conductive agent and a second conductive agent. The first conductive agent covers at least a portion of the surface of the Si-containing negative electrode active material particles. The second conductive agent is fibrous, and the average fiber diameter of the second conductive agent is larger than the average diameter of the first conductive agent. The second conductive agent preferably is in contact with at least two Si-containing negative electrode active material particles.

FIG. 1 shows an embodiment of a non-aqueous electrolyte battery of the present invention.

A coin-type battery 10 in FIG. 1 includes a pellet positive electrode 4, a pellet negative electrode 5, a separator 6, a positive electrode can 1, a negative electrode can 2, and a non-aqueous electrolyte (not shown).

The positive electrode 4 is disposed at the inner bottom face of the positive electrode can 1, and the negative electrode 5 is disposed at the inner bottom face of the negative electrode can 2. The positive electrode 4 and the negative electrode 5 face each other with the separator 6 interposed therebetween. The opening of the positive electrode can 1 is sealed with the negative electrode can 2 having a gasket 3 on the periphery thereof.

The negative electrode 5 includes a molded body of a material mixture including a Si-containing negative electrode active material, a conductive agent, and as necessary a binder, but does not include a current collector. The conductive agent included in the negative electrode 5 includes a first conductive agent and a second conductive agent.

By covering at least a portion of the surface of the negative electrode active material particles with the first conductive agent, the formation of a film derived from the non-aqueous electrolyte on a new surface created when the negative electrode active material particles repeat expansion and contraction upon charge and discharge is decreased. Also, the electric conductivity can be given to the active material particle surface. Thus, electric conductivity of the negative electrode active material particles can be kept.

As described above, the fibrous second conductive agent preferably is in contact with at least two negative electrode active material particles having the first conductive agent on the surface thereof. Based on such contacts, even when the active material particles expand and contract upon charge and discharge, electric conductivity between the active material particles can be kept. In addition, since the second conductive agent is fibrous, compared with particulate conductive agent, a large number of contact points are created between the second conductive agent and the active material particles, and the contacting portion increases its size. Therefore, even when charge and discharge are repeated, electric conductivity of the surface of each active material particle, and electric conductivity between the active material particles can be kept.

That is, based on the present invention, even with the repetitive charge and discharge, electric conductivity of each active material particle and electric conductivity between the active material particles in the molded body can be kept. Therefore, a high capacity non-aqueous electrolyte battery with excellent charge and discharge cycle characteristics can be obtained.

The first conductive agent is not particularly limited, as long as the material is conductive, but preferably includes a carbon material with the specific surface area of 200 to 800 $m^2/g$. Such a carbon material effectively covers at least a portion of the active material particle surface, and keeps the electric conductivity at the active material particle surface with a small amount, and also can decrease the formation of a film at the active material particle surface. When the specific surface area is below 200 m²/g, sometimes the electric conductivity of the active material particle surface becomes insufficient. When the specific surface area exceeds 800 m²/g, the amount of Li ion to be absorbed by the first conductive agent increases, sometimes leading to a large amount of retention (irreversible capacity). This also leads to a decline in battery capacity.

The specific surface area can be determined, for example, by BET method.

The first conductive agent preferably includes at least one selected from the group consisting of carbon black and carbon fiber A. Since such a material can effectively cover at least a portion of the surface of the active material particles even with a small amount, electric conductivity of the active material particles can be kept. Further, by covering the surface of the active material particles with such a material, film-formation on the surface of the active material particles can be decreased.

The specific surface area of the carbon material of at least one selected from the group consisting of carbon black and carbon fiber A may also be 200 to 800 m²/g. In this case as well, the effects same as the above can be obtained.

The first conductive agent preferably makes up 1 to 19 wt % of the molded body forming the negative electrode. By setting the first conductive agent amount to the range mentioned above, the first conductive agent can cover the at least a portion of the surface of the negative electrode active material particles, and the electric conductivity of the active material particles can be kept. When the amount of the first conductive agent is below 1 wt %, the decrease in the film formation and/or keeping of the electric conductivity at the surface of the active material particles may become insufficient. When the amount of the first conductive agent is larger than 19 wt %, due to the large specific surface area of the active material particles, as in the above, the first conductive agent absorbs lithium ions, increasing the irreversible capacity, and decreasing the battery capacity.

The first conductive agent may be particulate or fibrous. The average diameter of the first conductive agent is preferably 5 nm or more and 60 nm or less. For example, when the first conductive agent is particulate, the average primary particle size of the first conductive agent is preferably 5 nm or more and 60 nm or less, and further preferably 20 to 50 nm. When the first conductive agent is fibrous, the average fiber diameter of the first conductive agent is preferably 5 nm or more and 60 nm or less, and further preferably 5 to 30 nm.

By setting the average diameter of the first conductive agent to 5 nm or more and 60 nm or less, the first conductive agent can effectively cover the surface of the negative electrode active material particles, and the electric conductivity of the surface of the active material particles can be kept sufficiently. When the average diameter of the first conductive agent is smaller than 5 nm, it becomes difficult to disperse the first conductive agent in the molded body, and the electric conductivity of the surface of the active material particles may not be kept. When the average diameter of the first conductive agent is 60 nm or more, the electric conductivity of the surface of the negative electrode active material particles may not be kept sufficiently.

The average diameter of the first conductive agent refers to, the average particle size of the first conductive agent when the first conductive agent is particulate, and refers to the average fiber diameter when the first conductive agent is fibrous.

The average diameter of the first conductive agent is obtained by, for example, measuring the diameter of 2 to 10 grains of the first conductive agent with an electron microscope, and calculating the average of these diameter values.

When the first conductive agent is fibrous, its average fiber length is preferably 0.1 to 10 μm. By setting the average fiber length to 0.1 to 10 μm, the first conductive agent effectively covers the surface of the active material particles, and the electric conductivity of the surface of the active material particles can be kept sufficiently. The average fiber length can also be determined by using the electron microscope as in the above case.

The second conductive agent may be a fibrous material having electric conductivity.

The average diameter of the second conductive agent (average fiber diameter) is preferably 70 nm or more and 7 μm or less. When the average diameter of the second conductive agent is smaller than 70 nm, because of the excessively small average diameter compared with the fiber length of the second conductive agent, sometimes dispersing the second conductive agent in the molded body becomes difficult. When the average diameter of the second conductive agent is larger than 7 μm, sometimes the electric conductivity cannot be kept between the active material particles with a high expansion rate.

When the first conductive agent is particulate, the second conductive agent is selected so that its average fiber length is larger than the average particle size of the first conductive agent. When the first conductive agent is fibrous, the second conductive agent is selected so that its average fiber diameter is larger than the average fiber diameter of the first conductive agent.

When the first conductive agent is particulate, the second conductive agent is selected so that its average fiber length is larger than the average particle size of the first conductive agent. When the first conductive agent is fibrous, the second conductive agent is selected so that its average fiber length is larger than the average fiber length of the first conductive agent.

The average fiber length of the second conductive agent is preferably 5 μm to 500 μm, and further preferably 5 μm to 40 μm. For example, the average fiber length of the second conductive agent can be selected within the range so that it is larger than the average diameter or the average fiber length of the first conductive agent.

By using such a second conductive agent, electric conductivity between the active material particles can be kept sufficiently. When the average fiber length is smaller than 5 μm, sometimes electric conductivity cannot be kept sufficiently between the active material particles with a high expansion rate. When the average fiber length exceeds 500 μm, sometimes dispersing the second conductive agent homogeneously in the molded body becomes difficult.

The average fiber length and the average fiber diameter of the second conductive agent may be determined by using the electron microscope as in the case of the first conductive agent.

The second conductive agent preferably includes carbon fiber B having the average fiber length and the average fiber diameter of the above range. By using carbon fiber B as the second conductive agent, electric conductive network can be formed throughout the negative electrode. Further, with carbon fiber B, electric conductivity between the active material particles can be kept sufficiently compared with particulate carbon black. When particulate carbon black is used as the conductive agent, a plurality of carbon black particles is brought into contact with each other to form a chain cluster, and this cluster is in contact with the plurality of active material particles. However, since carbon black particles are just in contact with each other, when the molded body expands and contracts upon charge and discharge, the carbon black particles lose the contact between them, thereby failing to keep the electric conductivity between the active material particles. On the other hand, carbon fiber B is long as described above, and even the stress caused by expansion and contraction is applied to carbon fiber B, unlike the case in carbon black, carbon fiber B are not cut. Thus, the contact between carbon fiber B and the active material particles are kept and electric conductivity between the active material particles can be kept sufficiently.

In the case of carbon fiber B, the permeability of carbon fiber B to the non-aqueous electrolyte can be kept sufficiently.

Carbon fiber B further preferably has a hollow structure. By giving the hollow structure to the carbon fiber, the permeability of the carbon fiber to the non-aqueous electrolyte further improves. Additionally, by using the hollow structured carbon fiber, the stress to the active material particles upon expansion and contraction can further be eased.

The second conductive agent preferably makes up 4 to 22 wt % of the molded body. By setting the amount of the second conductive agent within the above range, electric conductivity between the active material particles can be kept sufficiently. When the amount of the second conductive agent is below 4 wt %, sometimes the electric conductivity between the active material particles cannot be kept sufficiently. When the amount of the second conductive agent is larger than 22 wt %, the proportion of the conductive agent in the molded body is excessively high, which may lead to a decline in capacity.

In the present invention, since the molded body forming the negative electrode includes the first conductive agent and the second conductive agent, the resistivity of the molded body at 25° C. can be set to 20$\Omega$·cm or less. Particularly, the resistivity of the molded body including 50 to 80 wt % of the negative electrode active material, 3 to 35 wt % of the conductive agent, and 1 to 10 wt % of the binder, and having a porosity of 20% or more can be set to 20$\Omega$·cm or less. Further, in the present invention, when the porosity of the molded body is 20 to 75%, further preferably 35 to 75%, the resistivity of the molded body can be set to 20$\Omega$·cm or less.

When the resistivity of the molded body is 20$\Omega$·cm or less, the electric conductivity of the negative electrode is kept high and charge and discharge cycle characteristics of the battery can be further improved. When the resistivity of the molded body is larger than 20$\Omega$·cm, sometimes polarization of the negative electrode increases upon charge and discharge, resulting in insufficient capacity. Further, charge and discharge cycle efficiency may decline.

The resistivity of the molded body after at least one charge and discharge cycle is preferably 20$\Omega$·cm or less. The molded body expanded due to the charge contracts upon discharge, but the degree of the contraction is lower than the degree of the expansion. Therefore the porosity of the molded body after charge and discharge is slightly higher than the porosity of the molded body immediately after it is manufactured. The resistivity of the molded body immediately after it is manufactured, i.e., without charge and discharge, may also be 20$\Omega$·cm or less.

The thickness of the molded body is preferably 100 to 800 $\mu$m. When the thickness is below 100 $\mu$m, sometimes it is difficult to manufacture the molded body. In the case of a battery with a diameter of 6 to 20 mm, the maximum thickness of the negative electrode (molded body) is about 800 $\mu$m.

The porosity of the molded body can be determined by using the volume of the molded body by its external dimension (Va)(apparent volume), and the actual volume of the molded body (Vb). That is, the porosity of the molded body can be determined by the formula: $\{(Va-Vb)/Va\}\times 100$. The volume of the molded body by the external dimension Va can be calculated by using the molded body size (for example, the area of the base×height). The actual volume of the molded body can be determined, for example, by using the absolute volumes of the components included in the molded body and the weight ratio of each component.

The negative electrode active material includes a material containing Si. For the material containing Si, for example, Si simple substance, an oxide including Si, a nitride including Si, and an alloy including Si may be mentioned. Particularly, the negative electrode active material preferably includes an alloy of Si as the first metal element and the second metal element that does not form an alloy with Li. Although it is not clear, by including the second metal element in addition to Si, deterioration of the negative electrode active material upon repetitive charge and discharge can be curbed.

The average particle size of the negative electrode active material particles is preferably 0.1 to 100 $\mu$m, and further preferably 4 to 60 $\mu$m. The average particle size of the negative electrode active material particles represents the average particle size of the aggregate of the active material particles, not the average particle size of the primary particle.

By setting the average particle size of the negative electrode active material particles to 0.1 to 100 $\mu$m, deterioration of the negative electrode active material due to expansion and contraction upon charge and discharge can be curbed. Also, by combining such a negative electrode active material particles with the first and the second conductive agent, electric conductivity of the surface of the active material particles and electric conductivity between the active material particles can be kept sufficiently.

When the average particle size of the negative electrode active material particles is smaller than 0.1 $\mu$m, the surface area of the active material particles increases, and sometimes the amount of necessary non-aqueous electrolyte increases. When the average particle size of the negative electrode active material particles exceeds 100 $\mu$m, the weight of the negative electrode active material included in the molded body varies, and the stress applied to the molded body due to the expansion and contraction upon charge and discharge cannot be dispersed sufficiently.

The second metal element is preferably at least one selected from the group consisting of Ti, Zr, Fe, Co, Ni, and Cu. Particularly, the second metal element is further preferably Ti. For example, the negative electrode active material preferably includes $TiSi_2$.

The weight ratio of Si to the second metal element is not particularly limited. The effects of the present invention can be sufficiently obtained when the weight ratio of Si is within the range of 5 to 95 wt % relative to the alloy.

In the alloy, Si may be crystalline or amorphous.

The alloy of Si and the second metal element may be manufactured by a conventional method in the art. The method includes, for example, mechanical alloying, mechanical milling, casting, liquid quenching, ion beam sputtering, vacuum deposition method, plating, and gas phase chemical reaction method.

As described above, the molded body forming the negative electrode may include a binder, in addition to the active material and the conductive agent. The binder to be added to the negative electrode is not particularly limited, as long as the material does not cause a chemical change in the charge and discharge potential of the negative electrode. For the binder, for example, polyacrylic acid, styrene butadiene rubber (SBR), polyimide, polyvinylidene fluoride (PVDF), and polyvinyl alcohol (PVA) may be used. These may be used singly, or may be used in combination of two or more.

Although the manufacturing method of the molded body forming the negative electrode is not particularly limited, a conventional method in the art may be used. The molded body may be obtained, for example, by obtaining granules, and by molding the obtained granules. The granules may be manufactured, for example, by spray-drying method, by which the mixing to the granulating can be carried out by the same device, a method using a tumbling granulator, and a method using a hi-speed mixer.

Upon making the granules, the obtained mixture is preferably not ground after mixing the negative electrode components. In other words, granules with a size that can be molded without grinding are preferably made. This is because the contact between the negative electrode active material particles and the second conductive agent is possibly lost when granules are obtained by drying the negative electrode component mixture to obtain a relatively large block, and then grinding the block.

The contact between the second conductive agent and at least two negative electrode active material particles with the first conductive agent covering at least a portion of the surface thereof can be confirmed, for example, by a scanning electron microscope (SEM) image.

The positive electrode may include, for example, a positive electrode active material, a conductive agent, and a binder.

For the positive electrode active material, a material capable of absorbing and desorbing lithium ions known in the art may be used. For such a material, for example, metal oxides such as $LiCoO_2$, $LiNiO_2$, $LiMn_2O_4$, $LiMnO_2$, $Li_4Mn_5O_{12}$, $Li_2Mn_4O_9$, $V_2O_5$, $V_6O_{13}$, $MnO_2$, $WO_3$, $Nb_2O_5$, and $Li_{4/3}Ti_{5/3}O_4$; composite oxides such as $LiCO_{1-x}Ni_xO_2$, and $LiMn_{2-x}A_xO_4$ (A represents an element other than manganese); and a polymer such as polyaniline may be mentioned. These materials may be used singly, or may be used in combination of two or more.

For the conductive agent and the binder to be added to the positive electrode, material known in the art may be used.

The positive electrode may be made by a conventional method in the art.

The non-aqueous electrolyte includes a non-aqueous solvent and a solute dissolved therein. For the solute, for example, $LiPF_6$, $LiBF_4$, $LiClO_4$, $LiCF_3SO_3$, $LiN(CF_3SO_2)_2$, $LiN(C_2F_5SO_2)_2$, and $LiN(CF_3SO_2)(C_4F_9SO_2)$ may be used. These may be used singly, or may be used in combination of two or more.

For the solvent, for example, propylene carbonate, ethylene carbonate, butylene carbonate, vinylene carbonate, dimethyl carbonate, diethyl carbonate, ethyl methyl carbonate, sulfolane, dimethoxyethane, diethoxyethane, tetrahydrofuran, dioxolane, and γ-butyrolactone may be used. These may be used singly, or may be used in combination of two or more.

The non-aqueous electrolyte may be carried by a polymer electrolyte, to form a gelled electrolyte.

For the material forming the separator, materials known in the art may be used.

In the following, Examples and Comparative Examples of the present invention are described. The present invention is not limited to these Examples.

EXAMPLES

Example 1

A coin-type battery as shown in FIG. 1 was made. The battery made had an external diameter of 6.8 mm, and a height of 2.1 mm.

(i) Negative Electrode Preparation

A negative electrode active material was made by the mechanical alloying method as in below.

Silicon and titanium were mixed so that the weight ratio of Ti to Si was 23:77 (Ti:Si=23:77). The obtained powder mixture in an amount of 1.4 kg was put in a vessel of a vibration mill (FV-20 manufactured by Chuo Kakohki Co., Ltd.). Into this vessel, 300 kg of stainless steel-made balls (diameter 2 cm) were put. After vessel was evacuated, Ar (99.999% purity, manufactured by Nippon Sanso Corporation) was introduced, and the pressure in the vessel was set to 1 atmospheric pressure. In the vibration mill, the amplitude was set to 8 mm, and the number of revolutions was set to 1200 rpm.

With the above conditions, a mechanical alloying operation was carried out for 80 hours, thereby obtaining a TiB23 wt %-Si77 wt % alloy powder. The obtained alloy powder was classified with a sieve to give a particle size of 45 μm or less, thereby obtaining a negative electrode active material.

A negative electrode material mixture was prepared by using the negative electrode active material prepared as described above, a first conductive agent (carbon nanofiber (CNF-T manufactured by Jemco Inc.), a specific surface area of 200 $m^2$/g, a length of 0.1 to 10 μm); a second conductive agent (vapor-grown graphite fiber, Carbere® (product name) manufactured by GSI Creos Corporation, a specific surface area of 50 $m^2$/g, a length of 1 to 30 μm, an average fiber length of 19 μm, hollow structure); and polyacrylic acid (Jurymer AC-10SH (product name) manufactured by Nihon Junyaku Co., Ltd., an aqueous solution having a concentration of 10 wt %, weight average molecular weight: about 1,000,000) as a binder, by a spray-drying method (a micro mist dryer MDL-050 (product name) manufactured by Fujisaki Electric). To be specific, after spraying a dispersion including the negative electrode active material, the first conductive agent, the second conductive agent, and an aqueous solution of binder into a vessel of the device used for the spray-drying, the mixture sprayed was dried with a hot blast, thereby obtaining a negative electrode material mixture.

In the obtained negative electrode material mixture, the mixing ratio between the negative electrode active material, the first conductive agent, the second conductive agent, and the binder was 69.0:11.5:11.5:8.0 (weight ratio).

The negative electrode material mixture was observed with a scanning electron microscope (SEM). Based on the obtained SEM micrograph image, it was confirmed that the first conductive agent covered at least a portion of the surface of the negative electrode active material particles, and that the second conductive agent was in contact with at least two negative electrode active material particles with the surface thereof being covered with the first conductive agent.

Then, this negative electrode material mixture was pressure-molded with a pressure of 1 ton/$cm^2$, thereby obtaining a disk-shaped molded body with a diameter of 3.7 to 3.8 mm, and a thickness of 0.42 to 0.44 mm. The porosity of the obtained molded body was 30%.

Then, the molded body was dried under a reduced pressure, at 190° C. for 10 hours, and lithium was attached by pressure on one face of the dried molded body, so that the molar ratio of Li to Si was 2.6, i.e., Li/Si=2.6. A negative electrode was thus obtained.

(ii) Positive Electrode Preparation

A positive electrode active material was made as in below.

Electrolytic manganese dioxide and lithium hydroxide were mixed so that the molar ratio of Mn to Li was 1:0.4 (Mn:Li=1:0.4). The obtained mixture was heat-treated in the atmosphere at 390° C. for 6 hours, thereby obtaining a lithium-containing manganese oxide. This lithium-containing manganese oxide was used as the positive electrode active material. The obtained lithium-containing manganese oxide can be expressed as $Li_{0.4}MnO_2$, although there may be a slight error in the molar ratio of lithium and the molar ratio of oxygen.

The obtained positive electrode active material, carbon black as the conductive agent, and a fluorocarbon resin (NEOFLON ND-1 (product name) manufactured by DAIKIN INDUSTRIES, LTD.) as the binder were mixed with a weight ratio of 90:5:5, thereby obtaining a positive electrode material mixture. This positive electrode material mixture was pressure-molded with 1 ton/cm$^2$, thereby obtaining a disk-shaped molded body with a diameter of 4.1 to 4.2 mm, and a thickness of 1.0 to 1.2 mm. This molded body was dried under a reduced pressure at 250° C. for 10 hours, thereby obtaining a positive electrode.

A coin-type battery as shown in FIG. 1 was made by using the obtained positive electrode and negative electrode. A stainless steel (SUS444) positive electrode can and a stainless steel (SUS403) negative electrode can were used. A polypropylene-made separator was used. The non-aqueous electrolyte was prepared by dissolving $LiN(C_2F_5SO_2)_2$ in a solvent mixture of propylene carbonate (PC), ethylene carbonate (EC), and dimethoxyethane (DME) with a concentration of 1 mol/L. The mixing ratio between PC, EC, and DME was 3:1:3 (volume ratio).

The obtained battery was named as Example 1 battery.

Example 2

A battery of Example 2 was made in the same manner as Example 1, except that carbon black (ketjen black: carbon ECP manufactured by Lion Corporation, a specific surface area of 800 m$^2$/g, a primary particle diameter (average diameter) of 39.5 nm) was used as the first conductive agent.

Example 3

A battery of Example 3 was made in the same manner as Example 1, except that vapor-grown carbon fiber (VGCF (product name) manufactured by Showa Denko K.K., a specific surface area of 13 m$^2$/g, an average fiber length of 10 to 20 μm) was used as the second conductive agent.

Example 4

A carbon sheet (TGP-H-060: manufactured by Toray Industries, Inc.) was ground, and classified with a sieve to give a fiber length of 500 μm or less, thereby obtaining a fibrous second conductive agent. By using thus obtained fibrous second conductive agent, a negative electrode material mixture was made with the tumbling granulation (Granurex GX-20 manufactured by Freund Corporation). Except for the above, a battery of Example 4 was made in the same manner as Example 1.

In the tumbling granulation, the negative electrode material mixture was made by spraying an aqueous solution of the binder to the mixture including the negative electrode active material, the first conductive agent, and the second conductive agent while tumbling the mixture in a high temperature atmosphere.

Example 5

A battery of Example 5 was made in the same manner as Example 1, except that the weight ratio between the negative electrode active material, the first conductive agent, the second conductive agent, and the binder was changed to 69.0:1.0:22.0:8.0.

Example 6

A battery of Example 6 was made in the same manner as Example 1, except that the weight ratio between the negative electrode active material, the first conductive agent, the second conductive agent, and the binder was changed to 69.0:19.0:4.0:8.0.

Example 7

A Zr23 wt %-Si77 wt % alloy was obtained in the same manner as Example 1, except that silicon and zirconium were mixed with a weight ratio of 77:23. A battery of Example 7 was made in the same manner as Example 1, except that this alloy was used as the negative electrode active material.

Example 8

A Fe23 wt %-Si77 wt % alloy was obtained in the same manner as Example 1, except that silicon and iron were mixed in a weight ratio of 77:23. A battery of Example 8 was made in the same manner as Example 1, except that this alloy was used as the negative electrode active material.

Example 9

A Co23 wt %-Si77 wt % alloy was obtained in the same manner as Example 1, except that silicon and cobalt were mixed in a weight ratio of 77:23. A battery of Example 9 was made in the same manner as Example 1, except that this alloy was used as the negative electrode active material.

Example 10

A Ni23 wt %-Si77 wt % alloy was obtained in the same manner as Example 1, except that silicon and nickel were mixed in a weight ratio of 77:23. A battery of Example 10 was made in the same manner as Example 1, except that this alloy was used as the negative electrode active material.

Example 11

A Cu23 wt %-Si77 wt % alloy was made in the same manner as Example 1, except that silicon and copper were mixed in a weight ratio of 77:23. A battery of Example 11 was made in the same manner as Example 1, except that this alloy was used as the negative electrode active material.

Negative electrode material mixtures prepared in Examples 2 to 11 were observed with SEM in the same manner as Example 1. Based on the obtained SEM micrograph, it was confirmed that the first conductive agent covered at least a portion of the surface of the negative electrode active material particles, and that the second conductive agent was in contact with at least two negative electrode active material particles with the surface thereof covered by the first conductive agent.

Comparative Example 1

A battery of Comparative Example 1 was made in the same manner as Example 1, except that only the first conductive agent used in Example 1 was used as the conductive agent, and the weight ratio between the negative electrode active material, the conductive agent, and the binder was changed to 69.0:23.0:8.0.

The negative electrode material mixture prepared in Comparative Example 1 was observed with SEM in the same manner as Example 1. Based on the obtained SEM micrograph, it was confirmed that the first conductive agent covered at least a portion of the surface of the negative electrode active material particles.

Comparative Example 2

A battery of Comparative Example 2 was made in the same manner as Example 1, except that only the second conductive agent used in Example 1 was used as the conductive agent, and the weight ratio between the negative electrode active material, the conductive agent, and the binder was changed to 69.0:23.0:8.0.

The negative electrode material mixture prepared in Comparative Example 2 was observed with SEM in the same manner as Example 1. Based on the obtained SEM micrograph, it was confirmed that second conductive agent was in contact with at least two negative electrode active material particles.

Comparative Example 3

A battery of Comparative Example 3 was made in the same manner as Example 1, except that graphite particles (SP-10: manufactured by Nippon Graphite Industries, average particle size 33 μm, specific surface area 3.9 m$^2$/g) were used as the second conductive agent, and a tumbling granulation method was used upon making the negative electrode material mixture. The weight ratio between the negative electrode active material, the first conductive agent, the second conductive agent, and the binder was set to 69.0:11.5:11.5:8.0.

The negative electrode material mixture prepared in Comparative Example 3 was observed with SEM in the same manner as Example 1. Based on the obtained SEM micrograph, it was confirmed that the first conductive agent covered at least a portion of the surface of the negative electrode active material particles, and the second conductive agent was in contact with at least two negative electrode active material particles with the first conductive agent covering the surface thereof.

Comparative Example 4

A material mixture paste was prepared by dispersing the negative electrode material mixture prepared in Example 1 in water, a dispersion medium. The obtained paste was applied on one face of a high purity copper foil, dried at 60° C., thereby obtaining a negative electrode precursor including a current collector and a negative electrode material mixture layer carried thereon. The thickness of the negative electrode material mixture layer was 80 μm.

A cross section of the negative electrode material mixture layer was observed with SEM. Based on the obtained SEM micrograph, it was confirmed that granules including the negative electrode active material, the conductive agent, and the binder kept its shape.

Then, from the negative electrode precursor, a sheet with a diameter of 12.5 mm was punched out, and the sheet was dried under a reduced pressure at 190° C. for 10 hours. A negative electrode was obtained by attaching a metal lithium by pressure on the negative electrode material mixture layer side of the dried sheet, so that the molar ratio of Li to Si, Li/Si, is 2.6 (Li/Si=2.6).

The positive electrode material mixture prepared in Example 1 was pressure-molded to obtain a positive electrode with a diameter of 16 mm, and a thickness of 1.0 to 1.2 mm.

A battery of Comparative Example 4 was made in the same manner as Example 1, except that the obtained negative electrode and positive electrode were used. The battery of Comparative Example 4 had an external diameter of 20 mm, and a height of 1.6 mm.

Comparative Example 5

A negative electrode material mixture paste was prepared by dispersing the negative electrode material mixture prepared in Comparative Example 1 in water, a dispersion medium. The obtained paste was applied on one face of a high purity copper foil, dried at 60° C., thereby obtaining a negative electrode precursor including a current collector and a negative electrode material mixture layer carried thereon. The thickness of the negative electrode material mixture layer was 80 μm.

A cross section of the negative electrode material mixture layer was observed with SEM. Based on the obtained SEM micrograph, it was confirmed that granules including the negative electrode active material, the conductive agent, and the binder kept its shape.

A battery of Comparative Example 5 was made in the same manner as Comparative Example 4, except that the above negative electrode was used.

Tables 1 and 2 show the arrangement of the batteries of Examples 1 to 11 and Comparative Examples 1 to 5. Table 1 shows the composition of the negative electrode active material alloy, the types of the first conductive agent and the second conductive agent, the negative electrode form, and the porosities of the molded body or the material mixture layer. Table 2 shows the average diameter and the specific surface area of the first conductive agent; the average fiber diameter and the average fiber length of the second conductive agent; and the first conductive agent proportion and the second conductive agent proportion in the molded body.

TABLE 1

| | Negative Electrode Active Material Alloy Composition | First Conductive Agent Type | Second Conductive Agent Type | Negative Electrode Form | Porosity of Molded Body or Material Mixture Layer (%) |
|---|---|---|---|---|---|
| Ex. 1 | Ti 23 wt %—Si 77 Wt % | A | C | Only Molded Body | 30 |
| Ex. 2 | Ti 23 wt %—Si 77 Wt % | B | C | Only Molded Body | 30 |
| Ex. 3 | Ti 23 wt %—Si 77 Wt % | A | D | Only Molded Body | 30 |
| Ex. 4 | Ti 23 wt %—Si 77 Wt % | A | E | Only Molded Body | 30 |

TABLE 1-continued

| | Negative Electrode Active Material Alloy Composition | First Conductive Agent Type | Second Conductive Agent Type | Negative Electrode Form | Porosity of Molded Body or Material Mixture Layer (%) |
|---|---|---|---|---|---|
| Ex. 5 | Ti23 wt %—Si77 Wt % | A | C | Only Molded Body | 30 |
| Ex. 6 | Ti23 wt %—Si77 Wt % | A | C | Only Molded Body | 30 |
| Ex. 7 | Zr23 wt %—Si77 Wt % | A | C | Only Molded Body | 30 |
| Ex. 8 | Fe23 wt %—Si77 Wt % | A | C | Only Molded Body | 30 |
| Ex. 9 | Co23 wt %—Si77 Wt % | A | C | Only Molded Body | 30 |
| Ex. 10 | Ni23 wt %—Si77 Wt % | A | C | Only Molded Body | 30 |
| Ex. 11 | Cu23 wt %—Si77 Wt % | A | C | Only Molded Body | 30 |
| Comp. Ex. 1 | Ti23 wt %—Si77 Wt % | A | — | Only Molded Body | 30 |
| Comp. Ex. 2 | Ti23 wt %—Si77 Wt % | — | C | Only Molded Body | 30 |
| Comp. Ex. 3 | Ti23 wt %—Si77 Wt % | A | F | Only Molded Body | 30 |
| Comp. Ex. 4 | Ti23 wt %—Si77 Wt % | A | C | Current collector + Material mixture layer | 30 |
| Comp. Ex. 5 | Ti23 wt %—Si77 Wt % | A | — | Current Collector + Material Mixture Layer | 30 |

A: Carbon Nanofiber
B: Carbon Black
C: Vapor-Grown Graphite Fiber
D: Vapor-Grown Carbon Fiber
E: Fibrous Carbon Material Obtained by Grounding Carbon Paper
F: Graphite Particles

TABLE 2

| | Average Diameter of First Conductive Agent (nm) | Specific Surface Area of First Conductive Agent ($m^2/g$) | First Conductive Agent Proportion (wt %) | Average Fiber Diameter of Second Conductive Agent | Average Fiber Length of Second Conductive Agent (μm) | Second Conductive Agent Proportion (wt %) |
|---|---|---|---|---|---|---|
| Ex. 1 | 10 to 20 | 200 | 11.5 | 203 nm | 19 | 11.5 |
| Ex. 2 | 39.5 | 800 | 11.5 | 203 nm | 19 | 11.5 |
| Ex. 3 | 10 to 20 | 200 | 11.5 | 150 nm | 10 to 20 | 11.5 |
| Ex. 4 | 10 to 20 | 200 | 11.5 | 7 μm | <500 | 11.5 |
| Ex. 5 | 10 to 20 | 200 | 1 | 203 nm | 19 | 22 |
| Ex. 6 | 10 to 20 | 200 | 19 | 203 nm | 19 | 4 |
| Ex. 7 | 10 to 20 | 200 | 11.5 | 203 nm | 19 | 11.5 |
| Ex. 8 | 10 to 20 | 200 | 11.5 | 203 nm | 19 | 11.5 |
| Ex. 9 | 10 to 20 | 200 | 11.5 | 203 nm | 19 | 11.5 |
| Ex. 10 | 10 to 20 | 200 | 11.5 | 203 nm | 19 | 11.5 |
| Ex. 11 | 10 to 20 | 200 | 11.5 | 203 nm | 19 | 11.5 |
| Comp. Ex. 1 | 10 to 20 | 200 | 23 | — | — | — |
| Comp. Ex. 2 | — | — | — | 203 nm | 19 | 23 |
| Comp. Ex. 3 | 10 to 20 | 200 | 11.5 | — | 33 | 11.5 |
| Comp. Ex. 4 | 10 to 20 | 200 | 11.5 | 203 nm | 19 | 11.5 |
| Comp. Ex. 5 | 10 to 20 | 200 | 11.5 | — | — | — |

[Evaluation]
(Resistivity Measurement)

Each of the negative electrode material mixtures prepared in Examples 1 to 11 and Comparative Examples 1 to 3 in an amount of 300 mg was molded with a metal mold having a diameter of 15 mm, and dried under a reduced pressure at 190° C. for 10 hours, thereby obtaining a molded body. The molded body was sandwiched with two predetermined current collectors, and the resistance of the molded body at 25° C. was determined to obtain the resistivity. In Comparative Examples 4 and 5, the resistivity of the negative electrode material mixture layer made by using the negative electrode material mixture paste was obtained. The results are shown in Table 3.

(Evaluation on Charge and Discharge Cycle Characteristics)

The batteries made in Examples 1 to 11 and Comparative Examples 1 to 5 were charged with a constant current of 0.3 mA/cm², until the battery voltage reached 3.1 V. The charged batteries were discharged with a constant current of 0.3 mA/cm², until the battery voltage dropped to 2.0 V. The charging current and the discharging current above were the value per unit area of the negative electrode.

Such a cycle of charge and discharge was repeated. The ratio of the discharge capacity at the 100th cycle to the discharge capacity at the second cycle was regarded as the capacity retention rate. The results are shown in Table 3. In Table 3, the capacity retention rate is shown by percentage. Table 3 also shows the discharge capacity at the second cycle.

TABLE 3

| | Resistivity of molded body (Ω·cm) | Discharge Capacity at Second Cycle (mAh) | Capacity Retention Rate (%) |
|---|---|---|---|
| Ex. 1 | 1.7 | 4.6 | 63.0 |
| Ex. 2 | 1.0 | 4.8 | 63.8 |

TABLE 3-continued

|  | Resistivity of molded body (Ω·cm) | Discharge Capacity at Second Cycle (mAh) | Capacity Retention Rate (%) |
|---|---|---|---|
| Ex. 3 | 8.5 | 1.6 | 52.4 |
| Ex. 4 | 12.0 | 4.6 | 51.3 |
| Ex. 5 | 20.0 | 4.8 | 54.1 |
| Ex. 6 | 20.0 | 4.4 | 55.8 |
| Ex. 7 | 2.1 | 4.6 | 60.6 |
| Ex. 8 | 1.9 | 4.6 | 61.2 |
| Ex. 9 | 2.0 | 4.6 | 60.9 |
| Ex. 10 | 1.9 | 4.6 | 61.5 |
| Ex. 11 | 2.1 | 4.6 | 60.6 |
| Comp. Ex. 1 | 41.2 | 4.5 | 45.1 |
| Comp. Ex. 2 | 27.0 | 4.9 | 41.2 |
| Comp. Ex. 3 | 25.0 | 4.9 | 30.6 |
| Comp. Ex. 4 | 1.7 | 3.0 | 68.0 |
| Comp. Ex. 5 | 41.2 | 2.5 | 60.5 |

Table 3 shows that the molded body made in Examples 1 to 4 had low resistivities, and the batteries of Examples 1 to 4 including those molded bodies had excellent charge and discharge cycle characteristics.

The electric conductivity of the active material particle and the electric conductivity between the active material particles can be kept sufficiently, by covering at least a portion of the surface of the negative electrode active material particle with the first conductive agent, and allowing the second conductive agent to be in contact with at least two negative electrode active material particles with the first conductive agent on the surface thereof. This enabled excellent battery performance.

The results of Examples 5 to 6 show that the resistivity of the molded body can be kept to low and excellent capacity retention rate can be obtained when the first conductive agent makes up 1 to 19 wt % of the negative electrode molded body, and the second conductive agent makes up 4 to 22 wt % of the negative electrode molded body.

Compared with Examples 1 to 6, the resistivity of the molded body was high, and charge and discharge cycle characteristics declined in Comparative Example 1, only including the first conductive agent; Comparative Example 2, only including the second conductive agent; and Comparative Example 3, including graphite particles as the second conductive agent.

Covering at least a portion of the surface of the active material particles with the first conductive agent curbs the film-forming on the particle surface upon the expansion and contraction of the negative electrode active material particles. Electric conductivity of the active material particles is also kept. Further, with the fibrous second conductive agent, a large number of the contact between the second conductive agent and the active material particles can be provided, and/or the contact portion can be made large. Therefore, even with the expansion and contraction of the active material particles, the contact between the second conductive agent and the active material particles can be kept, and the electric conductivity between the active material particles can be kept sufficiently. Thus, excellent battery performance is shown in Examples 1 to 6, including both the first conductive agent and the second conductive agent; and battery performance declined in Comparative Example 1 including only the first conductive agent and in Comparative Example 2 including only the second conductive agent.

The contact area between the second conductive agent and the negative electrode active material is small in Comparative Example 3, since graphite particles are used as the second conductive agent. Therefore, upon charge and discharge, with the expansion and contraction of the active material particles, the second conductive agent and the active material particles are probably separated, the electric conductivity between the active material particles is not kept, and battery performance declined.

In Comparative Examples 4 to 5, the negative electrode including the current collector and the negative electrode material mixture layer carried thereon was made by applying the negative electrode material mixture paste on the current collector. The current collector and the negative electrode material mixture layer were bonded with the binder, and the thickness of the negative electrode including the current collector and the negative electrode material mixture layer was smaller than the thickness of the negative electrode only including the molded body. Therefore, the degree of the expansion and contraction of the negative electrode used in Comparative Examples 4 to 5 was not so high. Thus, since the presence of just carbon fiber (first conductive agent) enables current collection, the effect of adding the second conductive agent is probably small.

As the results of Examples 7 to 11 show, when the M23 wt %-Si77 wt % alloy (M is Zr, Fe, Co, Ni, or Cu) was used as the negative electrode active material, excellent battery performance was achieved. When M was Ti (Example 1), battery performance was particularly excellent.

The negative electrode molded body included in the non-aqueous electrolyte battery of the present invention includes the first conductive agent and the fibrous second conductive agent, and therefore the electric conductivity of the active material particle and the electric conductivity between the active material particles can be kept sufficiently. Thus, charge and discharge cycle characteristics of the non-aqueous electrolyte battery of the present invention including the Si-containing negative electrode active material can be improved. That is, based on the present invention, a non-aqueous electrolyte battery with high capacity and excellent charge and discharge cycle characteristics can be achieved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte coin battery comprising:
a positive electrode,
a negative electrode,
a separator disposed between said positive electrode and said negative electrode, and
a non-aqueous electrolyte,
wherein said negative electrode includes a molded body of a material mixture including a Si-containing negative electrode active material particle and a conductive agent, said molded body not including a current collector,
said conductive agent includes a fibrous first conductive agent and a fibrous second conductive agent,
said first conductive agent has an average fiber diameter of 5 nm or more and 60 nm or less, said second conductive agent has an average fiber diameter of 70 nm or more and 7 μm or less,
said first conductive agent makes up 1 to 19 wt % of said molded body,
said second conductive agent makes up 4 to 22 wt % of said molded body, and
said first conductive agent covers at least a portion of a surface of said Si-containing negative electrode active material particle.

2. The non-aqueous electrolyte coin battery in accordance with claim 1, wherein said second conductive agent is in contact with said Si-containing negative electrode active material particle, the number of said Si-containing negative electrode active material particle in contact with said second conductive agent being at least two.

3. The non-aqueous electrolyte coin battery in accordance with claim 1, wherein a thickness of said molded body is 100 to 800 μm.

4. The non-aqueous electrolyte coin battery in accordance with claim 1, wherein the resistivity of said molded body at 25° C. is 20Ω·cm or less.

5. The non-aqueous electrolyte coin battery in accordance with claim 1, wherein said first conductive agent includes a carbon material having a specific surface area of 200 to 800 $m^2/g$.

6. The non-aqueous electrolyte coin battery in accordance with claim 5, wherein said first conductive agent is carbon fiber.

7. The non-aqueous electrolyte coin battery in accordance with claim 1, wherein the average fiber length of said second conductive agent is 5 μm to 500 μm.

8. The non-aqueous electrolyte coin battery in accordance with claim 1, wherein said second conductive agent is carbon fiber.

9. The non-aqueous electrolyte coin battery in accordance with claim 8, wherein said carbon fiber has a hollow structure.

10. The non-aqueous electrolyte coin battery in accordance with claim 1, wherein said Si-containing negative electrode active material particle includes an alloy of a first metal element and a second metal element,
said first metal element being Si and said second metal element being incapable of forming an alloy with Li.

11. The non-aqueous electrolyte coin battery in accordance with claim 10, wherein said second metal element is at least one selected from the group consisting of Ti, Zr, Fe, Ca, Ni, and Cu.

12. The non-aqueous electrolyte coin battery in accordance with claim 1, wherein said molded body has a thickness of 420 to 800 μm.

* * * * *